P. VON SCHMIDT.
Preserving Wood.
No. 4,560. Patented June 6, 1846.
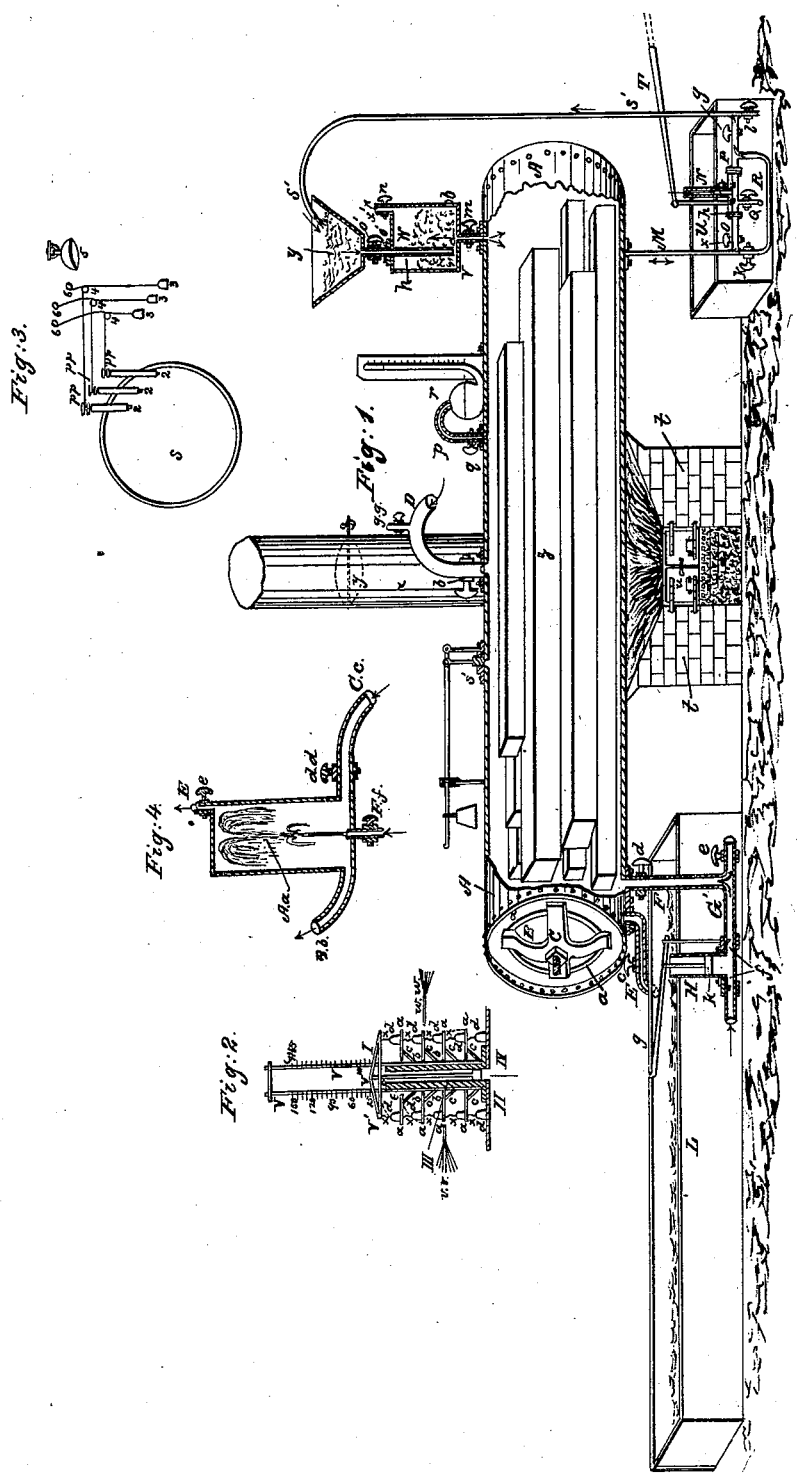

UNITED STATES PATENT OFFICE.

PETER VON SCHMIDT, OF WASHINGTON, DISTRICT OF COLUMBIA.

IMPREGNATING TIMBER.

Specification of Letters Patent No. 4,560, dated June 6, 1846.

*To all whom it may concern:*

Be it known that I, PETER VON SCHMIDT, of Washington city, District of Columbia, have invented a new and improved mode of impregnating timber or any other porous body by any fluid whatever by the operation of exhausting (or vacuum) and high pressure—in combination of charring timber by hot oil; and I do hereby declare that the following is a full and exact description.

The nature of my invention consists in this, that timber previously prepared for any intended purpose (or any other porous body) is introduced into a strong air tight iron cylinder in which the timber is first to be steamed, then, without removing the timber, the cylinder is filled with such a fluid, as the timber, (or other body) is intended to be impregnated with; a vacuum is then produced, (by means hereafter described) to expel the contained air from the pores of the wood, or substance, immediately after, hydraulic pressure is applied in a high degree to the fluid in the cylinder, by which the timber (or other body) will be thoroughly impregnated by the desired fluid. Should it be required that timber so impregnated to be charred also,—then, the fluid before used, is to be removed out of the said cylinder, the wood remaining, and oil of any kind is introduced in the cylinder; fire is made in the furnace under the cylinder and heated, till the oil gets hot to a degree, which will char the timber as desired. First the oil, and then the timber, is to be removed, the timber will be found fit for use as required.

To enable others skilled in the art to make and use my invention, I will proceed to describe its construction and operation, and refer to the accompanying drawing making a part of this specification.

Figure 1, (A,) a strong iron cylinder represented, (the outside partly removed to show the inside); (B,) the manhole and head, arranged to stand a vacuum and pressure also provided with an outside armature ring (a); (C) manhead-fastening with screw and nut; (D) steam pipe and stopcock (b)—to convey steam from a small steam boiler into the cylinder (A,)—(the small steam boiler not shown in the drawing); (g, g,) an escape-pipe and stopcock; (E,) the discharge-pipe and stop-cock (c) to carry off condensed steam and the dissolved sap of the wood from the steaming operation; (F) a pipe and stopcock (d), to charge, and to discharge the fluid from the cylinder (A); (G) a horizontal conducting-pipe with a stop-cock (e) and which is connected also with the pipe (F); (H) a large, single or double forcing-pump—with two valves (f, f,)—both valves to open toward the pipe (F) and connected with the conducting pipe (G); (I) the lever or handle of the forcing pump (which pump may be worked by cranks or otherwise); (K) the piston; (L) a large receiving box or basin, equal in capacity of the cylinder (A) to receive the fluid intended for impregnation; (M) a small pipe connecting the cylinder (A) with (N) the hydraulic forcing pump, which is further connected by (O) the small conducting pipe and the stopcock (x); (P) the connecting pipe continued with a stopcock (g); (h, h,) two valves of the forcing pumps (N) both opening toward (P); (Q) an entry pipe with a stop-cock (i); (R,) communication pipe with the hydraulic press-pump (N) the pipe (M) and cylinder (A)—with a stopcock (k); (S, S,) a small elevating pipe provided with a stopcock (l,) near the lower extremity of the pipe (s'). The same pipe is connected with the connecting pipe (P) above the stopcock (l,) and carried up to and into the funnel (Y). (T,) lever or handle of the hydraulic press-pump; (U) a small receiving box for the fluid; (V) a small connecting pipe with a stopcock (m) which connects the upper part of the cylinder (A) with the air receiving box (W) with an outlet tube (X') and stopcock (n); (Y) a funnel, connected with the air receiver (W) by a small pipe (Z) with a stopcock (o)—the pipe (Z) being open at the lower end reaching near to the bottom of the air-receiver (W); (p) a small pipe with a stopcock (q) to communicate the cylinder (A,) and (r,) the barometer; (s) a common safety valve with lever and weight; (t, t,) the supports of the cylinder (A) (or the furnace); (u) the fire-place; (v) the ash pit; (w) the furnace proper; (x) the chimney; (y) a heat regulator of the furnace or shutter; (z) represents the timber into the inside of the cylinder (A).

Fig. 2, an index or indicator of pressure for steam, or any fluid, it is so arranged as to show by a scale, at any time, the number of pounds of pressure which a cylinder, or steam boiler may be exposed on every square inch of surface. The construction of said indicator is as follows: (III) is a barrel of iron of one square inch bore, fixed by screws and flanges, at any convenient point to the upper part of a cylinder or steam-boiler, the hole of the barrel (III) being brought by an opening in connection with the inside of the cylinder (A). (IV) a piston nicely fitted into the barrel (III,) the piston-rod (VIII) extending all the way of the barrel up, and projecting a little above it, at the upper extremity of the piston-rod. (VIII) is a horizontal cross (I) fixed at each end of said cross are weights (d, d, d, etc.) in any desired number attached by strings (x x x etc.) hanging one below the other at some distance leaving space between them for moving of the weights up or down. At the outside of the barrel (III) is a frame (VV) fixed, extending double the length above the said barrel, on the projecting parts of the frame (VV) above the barrel (III) is the scale divided from below upward—showing the pounds. On both sides of the barrel and frame (VV) are movable shelves (a, a, a, etc.) fixed by hinges (6) to it, made one above the other in corresponding distances with the height of the weights for the free movement of the same between them; the weights in being connected with the cross piece (VIII) and piston-rod, will move upward, leaving the shelf, on which they rested, and elevate the next shelf which while turning on their hinge (b) above said weight when the piston is forced upward by the pressure of steam or fluid into the boiler, or cylinder, and will lower down, and settle again on its proper shelf, when the pressure abates, and the piston descends in the barrel (III). To prevent that the shelves (a, a, a, etc.) may not move lower down than the horizontal position, they are supported in a proper way by the braces (c', c', c', etc.). The shelves having a small slit from the center outward for the purpose that the strings (r) of the weight (d) may move freely in them when the weights rise and begin to lift the shelf also at (v v or w w) or at any determinated point of pressure small tubs are connected with the inside of the barrel (III) to the outside end of said tube (w or w w) a whistle, such as common on locomotives or any other whistle is fixed for the purpose to give alarm when the piston (IV) has passed such a point in ascending.

The operation of the indicator of pressure is simply as follows. The weights (d, d, d, etc.) being fixed and connected one to the other by strings, as said above, and in such a manner, that each string increases in length between the weights, in passing downward from the cross piece (VI) the weights (d, d, d,) resting on the shelves (a, a, a,), but if the piston would be forced upward in the barrel (III) from the steam or fluid, it would raise and carry up one weight (d) after the other, which weight will balance exactly the power or pressure against one square inch of the boiler surface, and will be indicated on the scale at the frame (V V) in pounds—should the pressure in the cylinder abate— the weights (d d) will settle down on their respective shelves, accordingly, but should the pressure still increase and the piston (IV) would pass the whistle hole (v v or w w) then the alarm will be given, that the pressure has increased to its maximum.

Fig. 3, represents the end view of a part of the cylinder (A) in connection of the calorie or heat indicators, consisting of several alloy safety valves (of Cadw. Evan's invention). (1) The cylinder or a steam-boiler. (222) Three of said alloy safety valves, each containing an alloy of different degree of fusion. (333) weights. (444), pulleys. (g',) a small bell. (666) Three small hammers attached to springs and connected with the pulleys.

Fig. 4, a steam apparatus to produce a sudden vacuum. (A, a,) a cylinder or vessel of strong iron perfectly air tight. (B b,) a pipe, and part of the pipe (D Fig. 1.) (C c,) a pipe and stopcock (d d,) to be connected with some steam boiler (not shown in the drawings.) (E e,) a pipe and stopcock for the escape of the air from (A a). (F f) a pipe and stopcock, in the center of the bottom of the apparatus, connected with some arrangement to produce a jet of cold water upward into the cylinder (A a,) as represented in the drawings.

The operation is as follows: Any porous timber or other substance may be perfectly impregnated with any desired fluid, with or without charring, as it may be required— the operation without charring would be as follows: The head of the manhole (B, Fig. 1,) being removed,—the timber intended for impregnating introduced in the cylinder (A) as shown at (Z) after which the manhole (B), to be air tight closed,—The stopcock (c) at the pipe (E) and (b) being open, as well as the passage (D) from the steam boiler, (steam boiler not shown in the drawing)—the steam passing through the pipe (D) in the cylinder (A) for the purpose to steam the timber (Z) containing in the cylinder A—the condensed steam in (A) and the desolved sap of the wood, will pass off through the pipe (E) and is to be carried beyond the box (L) as waste.—The steaming must be continued, till the fluid from the pipe (E) appears clear and without color and taste resembling distilled water, then, it may be considered that the wood has been completely steamed;—The stopcocks (b at D and c', at the pipe E) is now shut, and the stopcocks (m, and, n,)

open for the purpose, that the air, containing in the cylinder (A) may escape;—The stopcock (d) is also opened—and (e, q, k, & x,) shut;—From the box (L) in which the fluid intended for impregnating is kept—the fluid is forced by the pump (H) into the cylinder (A)—the pumping is continued till the said fluid makes its appearance at the open pipe (X) at the air receiver (W) the forcing or pumping is suspended,—the stopcocks (d, o', n, i, l, & k) being shut—and (m, x, g, q) open;—The small hydraulic pump (N) is put in motion—the fluid from the cylinder (A) being drawn by said pump (N) through the pipe (M & O) and forced further through the valve h and pipe P up the pipe (S S,) into the funnel (Y) to enter again into the cylinder (A) by the continuation of said operation or pumping a vacuum, by degrees, will be formed in the cylinder (A)—the air which has been containing in the pores of the wood (Z) being withdrawn, raises, collects, and enters through the pipe (V) the air receiver (W)—the fluid from the air receiver descending at the same time to fill the place of the fluid drawn out by the pump at (N).—The operation or pumping is continued till the air receiver (W) being nearly empty of the said fluid and filled with air from the wood—which may be observed through a piece of glass (Z Z) inserted for that purpose near the bottom of the air-receiver (W);—The stopcock (m) is then shut, and (o', and n,) opened,—the fluid from the funnel (Y) descends and filling the air-receiver (W) again—while the air escaping through the pipe K' till filled to overflow at (X')—(X') and (o') is then shut, and (m) open, the same operation is repeated as now described, and continued till the barometer (r) indicate the desired vacuum in the cylinder (A) showing also that most, or all, of the air from the pores of the wood ( or any other substance) is removed.

The process as above described is calculated to disengage the air from the timber by degrees, which in some cases would be desirable,—but should it be required to produce a vacuum at once, the following apparatus is to be used as represented in the drawing (Fig. 4).—This apparatus is originally calculated to be connected with the cylinder (A), so, that the pipe (Bb, Fig. 4) and the pipe (D, Fig. 1,) to be one and the same, in such a manner that the steam from the steam boiler (not shown in the drawing) in all cases may pass by the pipe (Cc,) through the cylinder (Aa, Fig. 4) and through (Bb, or D,) into the main cylinder (A Fig. 1,) for the steaming the timber as before mentioned.—But, should it be desired to produce a vacuum by said apparatus—the stopcock (b, Fig. 1) to be shut, (Ff, Fig. 4) and (g g, Fig. 1) also,—but (Ee, and d, d,) open,—The steam when admitted through the pipe (Cc) from the steam boiler,—displaces or drives out the air from (Aa,) till only steam escapes through (g g, and Ee).—The stopcock (g g and Ee & d d) being then shut, and the jet stopcock (Ff,) opened—and cold water injected in (Aa) condensing the steam and producing a vacuum of vast space at once,—by opening the stopcock (b, Fig. 1) the vacuum is communicated to the cylinder (A) by which the air from the pores of the wood (Z) or any other matter is dislocated and collected into the cylinder (Aa) as before,—when the stopcock (b and Ff,) being shut again, and (g g, Ee & d d,) opened— the steam let on again, the air so collected in (Aa) is displaced by the steam—the steam condensed by the jet of cold water—and a vacuum produced as before.—The operation has to be repeated till the barometer (r) indicates the desired vacuum in the cylinder (A) as above described: either way can be chosen to create a vacuum, as circumstances may direct. For said purpose to impregnate timber, etc., with fluid after the desired vacuum is procured and the air from the pores of the wood removed, the high pressure is then employed as follows:

The stopcock (m) from the air-receiver and (q) at the barometer, and the stopcocks (g and x) at the hydraulic pump are shut,—and (i and k) opened, the safety valve being properly loaded with the intended weight of pressure,—a communication is also made or exists with the barrel (III, Fig. 2) of the pressure indent, and inside of the cylinder (A). (Fig. 2, being originally attached at the upper part of the cylinder (A),—but in the drawings it is shown separately, for better illustration). The box (U) containing some of said fluid for impregnation, the lever (T) being put in motion— the fluid from the box (U) forced into the cylinder (A) and continued till the safety valve is lifted from the fluid inside of the cylinder—as a sign that the desired pressure has been obtained—by this pressure of the fluid, the pores of the submerged substance in the cylinder are still more or complete penetrated—as it would be impossible to extract all the air from the pores of the wood—the said pressure above the common pressure of the atmosphere will reduce the space which the air should occupy—in proportion of the pressure applied, to the common pressure of the asmosphere by such a remedy the air remaining in the pores of the wood may be reduced to a very small portion—the fluid penetrating in same time the fibers of the substance, has the desired effect, even after the pressure would be removed, and the small particles of air expand in equilibrio with the atmosphere.

The use and connection of the pressure indent (Fig. 2) is of importance,—indicating at every stroke of the forcing pump the increase of the pressure on the fluid into the cylinder (A)—or the decrease of pressure, by the raising or lowering of the piston with the several weights attached to it—suppose each of the weights (d Fig. 2) to be 5 lbs—three such weights (d, d, d,) had to be lifted in succession from their resting places (a, a, a,) and this would show the pressure in the cylinder (A) to be 15 lbs., or one atmosphere—it would indicate the pressure constantly, to any degree in correspondence with the pressed fluid (or steam) of the cylinder (A) till at last the safety valve (s) would determine the desired points of pressure,—the difference between the safety valve, and the pressure indicator, is, that the latter showing any pressure, degree after degree, which, by a common safety valve is not the case—but showing only one point of pressure, and not the pressure above or below the terminus.

"(The pressure indicator attached to a common steam boiler would have many advantages, and should be so arranged that when the steam into the boiler had raised above its determined pressure—the piston (III), into the barrel (IV) had passed by the pressure of steam a hole at the side of said barrel, to said hole a whistle to be connected, similar to a locomotive whistle—the steam in rushing through said hole left open by the said piston, and sound the whistle—the shrill and penetrating notice would be carried to a great distance—and indicate that the steam into the boiler is above the determined point of pressure. The said pressure indicator, inclosed and well secured for abuses on board of steamboats would be the best auxiliary to guard against disasters occasioned by the exploding of steam boilers.)"

Should it be required to impregnate the same timber with two different fluids in succession, as in the case to convert wood into stone (as it is commonly called). In such instance sulphate of iron in solution is first introduced into the cylinder (A)—(after the wood having been sufficiently steamed) the wood has to undergo the same process of exhaustion and high pressure as before described—then the sulphate of iron is withdrawn from the cylinder (A) and collected for further use, into the box (x) or any other vessel, by opening the stopcocks (d, e, and n, m). Muriate of lime in solution is then introduced on the wood into the cylinder (A) as before. The vacuum is renewed, as well as the high pressure as above described—after which, the stopcocks (d, e and n, m) are opened and the remaining muriate of lime discharged from the cylinder (A), the manhead (B) taken off, and the timber removed which will be found perfectly impregnated as desired. A new lot of timber may be introduced into the cylinder (A) and the process repeated as described before.

The charring of the impregnated timber is to insure the timber against the destructive operation of marine worms, when required, the operation of charring with hot oil is as follows:

After the process of impregnating the timber, as above mentioned, with the desired fluids is completed, and the fluid from the cylinder (A) withdrawn, (the timber remaining in the cylinder (A), oil of any kind is introduced into the cylinder (A) until full near to the stockcock (m):—(m, and n,) being open; Fire is made in the furnace (w)—and the heat regulated by the shutter (y) in the chimney (x). The oil in the cylinder (A) to be heated to a degree that will char wood as desired—such a degree of heat will be known by the caloric indicators (Figs. 3,—1,) represented in the drawing, and shown detached from the cylinder (A)—but is calculated to be in connection with the cylinder (A) at any convenient place. The three tube (2, 2, 2,) containing each, alloy, which, of each, would melt at different degrees of heat,— one of these tubes, (p p) must contain alloy of a melting point that would heat oil to the determined degree to char wood—the other two tubes containing alloys of lower melting point, but each of them different (these collection of tubes are nothing more then Mr. Cadwal Evan's, invented alloy safety valves),—should the oil into the cylinder (A) be heated to any degree to correspond with the melting point of any of the alloys into the tubs—the barrel (p p) would be set free, the weight (3) descend and carry around the pulley (4) by this motion the hammer (6) striking against the bell (5) and indicate that the oil has been heated already to such a degree,—and after the third and last bell had rung then the fire should be put out immediately—the oil from the cylinder (A) withdrawn, and the timber removed as before mentioned the timber will be found completely incrusted and charred without the least injury to the fibers of the wood or its flexibility.

What I claim as my invention, and desire to secure by Letters Patent for the purpose to impregnate timber or any other porous substance by any desired fluid, and to incrust or char said wood in a complete manner in heated oil—is;

1. The following combination of the operations—viz: The steaming of wood in combination of exposing the same immersed in any desired fluid to a vacuum, further in combination with the application of high pressure by a hydraulic press pump,—and finally if required in combination of charring, or incrusting by coal, the impregnated wood in heated oil as set forth—all these operations are done in one and the same apparatus, as before described in detail, in the specification, and illustrated by the drawings:—By the different combined actions upon the wood, a perfect impregnation is accomplished and by the incrusting or charring of the wood in heated oil, the timber so prepared, is more lasting and durable than iron, therefore, the combined actions upon the timber, as set forth, have the advantage over all other modes to saturate, or to carbonize timber which has been practised heretofore.

2. I claim the arrangements of the air receiver (W Fig. 1.) in combination with the funnel (Y) for the purpose and use as set forth.

PETER VON SCHMIDT.

Witnesses:
JULIUS VON SCHMIDT,
ALLEXEY W. VON SCHMIDT.